United States Patent [19]
Chraplyvy et al.

[11] Patent Number: 5,546,210
[45] Date of Patent: Aug. 13, 1996

[54] MULTI-CHANNEL OPTICAL FIBER COMMUNICATION SYSTEM

[75] Inventors: Andrew R. Chraplyvy, Matawan; Fabrizio Forghieri, Princeton; Robert W. Tkach, Little Silver, all of N.J.

[73] Assignee: AT&T Corp., Murray Hill, N.J.

[21] Appl. No.: 501,887

[22] Filed: Jul. 13, 1995

Related U.S. Application Data

[63] Continuation of Ser. No. 199,364, Feb. 18, 1994, abandoned.

[51] Int. Cl.$^6$ .................................................. H04J 14/02
[52] U.S. Cl. ........................... 359/124; 359/161; 359/173; 385/122
[58] Field of Search ................................. 359/114, 124, 359/127, 134, 160–161, 173, 179, 326–327, 341; 385/24, 122; 372/6, 21

[56] References Cited

U.S. PATENT DOCUMENTS

| | | | |
|---|---|---|---|
| 4,700,339 | 10/1987 | Gordon et al. | 359/134 |
| 5,035,481 | 7/1991 | Mollenauer | 359/124 |
| 5,224,183 | 6/1993 | Dugan | 359/127 |
| 5,410,624 | 4/1995 | Morkel | 385/24 |

OTHER PUBLICATIONS

J. P. Robinson, "Optimum Golumb Rulers", *IEEE Transactions on Computers*, vol. c–28, No. 12, Dec. 1979, pp. 943–944.

W. C. Babcock, "Intermodulation interference in radio systems," *Bell Syst. Tech. J.*, vol. 32, pp. 63–73, Jan. 1953.

M. D. Atkinson, N. Santoro, and J. Urrutia, "Integer sets with distinct sums and differences and carrier frequency assignments for nonlinear repeaters," *IEEE Trans. Commun.*, vol. COM–34, pp. 614–617, Jun. 1986.

Forghieri et al. "Reduction of four–wave–mixing cross talk in WDM systems using unequally spaced channels" OFC/IOOC '93 Technical Digest, Feb. 26, 1993. pp. 252–253.

*Primary Examiner*—Leo Boudreau
*Assistant Examiner*—Kinfe-Michael Negash
*Attorney, Agent, or Firm*—George S. Indig

[57] ABSTRACT

Wavelength Division Multiplexed channels in optical fiber communications systems have channel-to-channel frequency spacings which prevent substantial coincidence of 4-wave mixing products with channel carriers. As a consequence, system capacity is increased.

19 Claims, 6 Drawing Sheets

MIXING PRODUCTS WITH 10 CHANNELS AT 1,6,11,16,21,26,31,36,41,46

FIG. 4

MIXING PRODUCTS WITH 10 CHANNELS AT 1,6,16,22,30,39,50,57,69,82

CENTER 1546.28 nm   SPAN 20 nm
RB 0.1 nm

CENTER 1546.28 nm          SPAN 20 nm
RB 0.1 nm

FIG. 10

EQUAL CHANNEL SPACINGS          INPUT POWER 5 dBm

FIG. 11

UNEQUAL CHANNEL SPACINGS        INPUT POWER 5 dBm

MULTI-CHANNEL OPTICAL FIBER COMMUNICATION SYSTEM

This application is a continuation of application Ser. No. 08/199364, filed on Feb. 18, 1994 now abandoned.

TECHNICAL FIELD

The invention concerns high capacity optical fiber communication providing for wavelength division multiplexing.

DESCRIPTION OF RELATED ART

Introduction and commercialization of the erbium-doped fiber amplifier (EDFA) has had a profound effect on optical fiber communications. It is serving a role in single-channel systems in which it replaces optical-to-electronic repeaters over substantial fiber span lengths. Its operation, centered about 1550 nm, coincides with a desirable low-loss region for silica-based fiber. Terminal and other ancillary apparatus is designed to accommodate use at this wavelength.

The EDFA permits practical realization of wavelength division multiplexing (WDM). Systems provide for multiple-channel operation, with channels both of sufficient spacing to accommodate state-of-the-art frequency stabilization, and of total bandwidth within the passband of the EDFA. This ability to simultaneously amplify all channels—has increased interest in WDM.

U.S. patent application Ser. No. 08/069,952, filed May 28, 1993, describes and claims systems which solve a previously overlooked problem. Most advanced single-channel systems have taken advantage of dispersion-shifted fiber (DSF). Design of this type of fiber depends upon "shifting" the dispersion null point in the single mode silica fiber from its usual 1310 nm position to that of the desired 1550 nm carrier wavelength. This elimination of chromatic dispersion has permitted system operation at bit rates of 2.5 Gigabits/second (Gb/sec) over span lengths of hundreds of kilometers. Unfortunately, installation of systems providing for WDM operation, or for planned upgrading to WDM operation, has been thwarted by the realization that multiple-channel operation under contemplated conditions is limited by a, nonlinear effect—by 4-wave mixing (4WM). For usual anticipated distances and bit rates, 4-channel systems are precluded. The essence of the cited pending application is avoidance of operation at too low a dispersion. Provision of a precisely-defined small chromatic dispersion is sufficient for operation at per-channel bit rates otherwise prohibited by 4WM using DSF. Other system designs in that application take advantage of the dispersion of concatenated and dispersion compensated systems to assure the phase-mismatch to lessen implications of 4WM.

Another pending U.S. patent application Ser. No. 08/069, 962, now U.S. Pat. No. 5,322,516, describes and claims specific, finite-dispersion fibers for use with multiple channels centered about the preferred 1550 nm operating wavelength ("wavelength division multiplex fiber" or "WDMF"). The claimed fiber designs continue near-term contemplated single-channel systems using DSF. On the possibility that the provided—for dispersion will interfere with high bit-rate operation for very long span lengths and/or for power levels substantially above the present—1 m watt operation, WDMF may be dispersion-compensated by usual proposed compensating fiber. The relatively small dispersions to be compensated permit use of compensating fiber of lower doping levels or of shorter lengths, and, accordingly, lessens added insertion loss.

Terminology

WDM—Wavelength Division Multiplexing, providing for multi-channel operation within a single-fiber. This approach is important since it permits simultaneous amplification of a set of channels by a single rare earth-doped fiber amplifier. The erbium-doped fiber amplifier, has a usable bandwidth, $\Delta\lambda$ in the range of 10–20 nm. In general, WDM systems considered have a total bandwidth, for a set of channels, within this range.

Span—This is a repeaterless fiber length which may or may not include optical amplifiers. At either end of the span, there is provision for conversion between electrical and optical signal form. Conversion may be by a transmitter, or receiver, or repeater.

DSF—Dispersion Shifted Fiber in which total chromatic dispersion nulling is "shifted" from some reference wavelength value to the carrier wavelength. WDMF—Wavelength Division Multiplex Fiber as described and claimed in U.S. patent application Ser. No. 08/069,962, filed May 28, 1993. WDMF has an absolute magnitude of dispersion of 1.5–4 ps/nm-km at a wavelength of 1550 nm.

4WM—Four Wave Mixing. As described, this is the prevalent nonlinear capacity limit for usually contemplated WDM systems.

EDFA—Erbium Doped Fiber Amplifier.

SUMMARY OF THE INVENTION

In contrast with evenly-spaced WDM channel operation, uniformly used in systems described in the literature, the inventive systems are designed to operate with unequally-spaced channel-to-channel operation. Preferred embodiments satisfy an algorithm which prohibits coincidence of any 4WM product with a designated nominal channel carrier. There is a further preference for algorithmic design criteria providing for a least spacing which results in a minimized total bandwidth within a desired passband, e.g. for an EDFA.

Unequally-spaced channels are initially considered an alternative to provision of finite dispersion. The described WDM systems will likely be used to "enable" operation with DSF, as alternative to use of WDMF. By its use, already-installed systems using DSF may be upgraded to per-channel bit rates sufficient to justify multi-channel use. Information in the Detailed Description suggests a 4× increase in capacity for optimally-spaced channels (as compared with that for equal-spaced channel operation).

Of longer term significance, channel spacing in accordance with the algorithm presented, permits the same 4× improvement in "enabled" systems—e.g., for systems operating with WDMF over the entire 4WM—limited range of operation. The same advantage is obtained in other enabled systems—those using compensating or concatenated fibers. Contributing fibers in such systems may use smaller dispersion levels now permitted by unequal channel spacing, (with desirable implications including reduced loss associated with doping levels).

Experiment establishes the feasibility of operation with 8 or more WDM channels while staying within the EDFA passband. Apparatus is available for assuring needed channel stabilization—perhaps an order of magnitude greater than for equal channel spacing (for constant minimum spacing).

BRIEF DESCRIPTION OF THE DRAWINGS

FIGS. 6–9 compares spectra for equally-spaced channels and for algorithmically-determined spacing.

DETAILED DESCRIPTION

General

System designs and system operation of the invention are useful where 4WM is the dominant limitation on capacity. This is true for long-haul multichannel systems employing DSF. A reference "long-haul multi-channel system" is defined as of span length 360 km, as having 3 equally-spaced EDFAs, having 4 channels of total bandwidth satisfying passband requirements. As an example, the passband of the EDFA is of a maximum of approximately 30 nm. In present practice, systems are designed to provide for a total bandwidth of from 10 to 20 nm. Other system requirements are that the band be centered about a wavelength of 1550 nm, and that bit error rate $\leq 10^{-6}$/sec.

Consistent with this premise, a 360 km span length, 4-channel, 1 mw/channel equally-spaced WDM system operating with DSF has a total capacity of about 2 Gb/sec. For these purposes, this DSF system is referred to as "disabled". The invention is applicable to this "disabled" system. Using the algorithmically determined unequal channel spacings, capacity is increased by the same multiplier of at least 4× as determined in other experimental work (or to about 12 Gb/sec. for the same total bandwidth).

The inventive system approach is applicable to "enabled" systems—to equally-spaced systems providing for a minimum chromatic dispersion of an absolute value of at least 1.5 ps/nm-km for the major portion of fiber constituting the span. (The 360 km, 4-channel system, otherwise as above, has a capacity of about 120 Gb/sec.) For such systems, the same improvement, well in excess of 4×, is obtained (to about 900 Gb/sec). The same multiplier applies for dispersion values significantly in excess of this minimum limit. At least for near-term purposes, fiber dispersions in excess of about 4 ps/nm-km assure sufficient capacity for evenly-spaced channels. Accordingly, preferred embodiments for unequal-channel spacing in enabled systems are for this 1.51–4 ps/nm-km fiber dispersion range.

Figure 2:
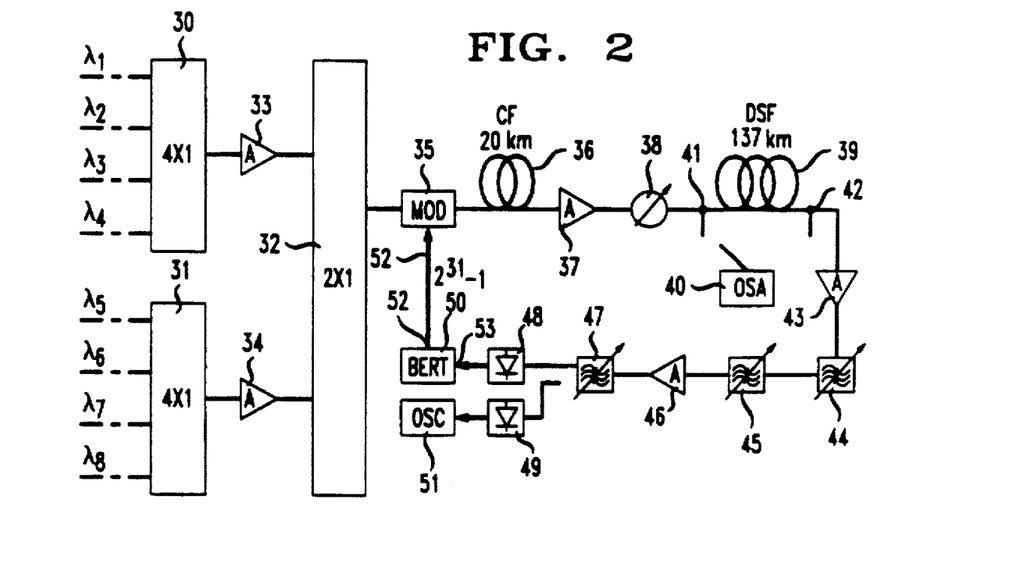
FIG. 2 is a circuit diagram for the experimental WDM system which was used in developing some of the data of this disclosure.
Figure 3:
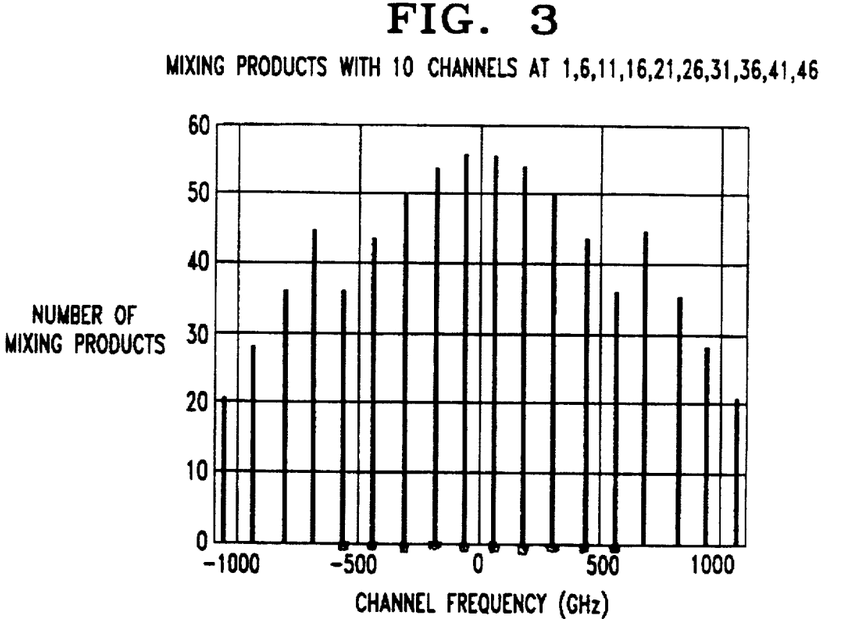
FIG. 3 is a plot relating frequency of four-wave mixing products to WDM-channel frequencies for conventional equal-channel spacing.
Figure 4:
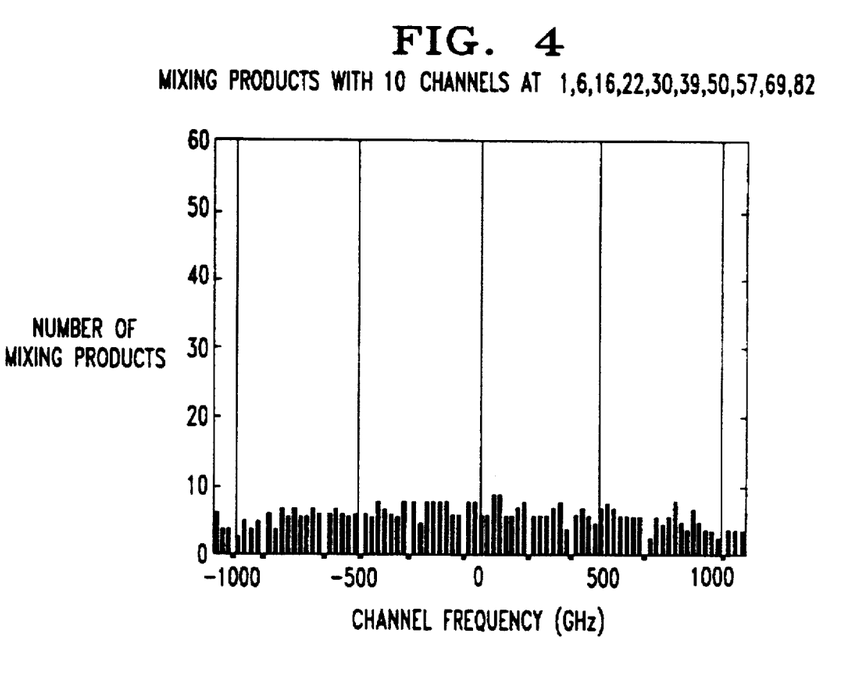
FIG. 4 on the same coordinates as FIG. 3 relates these properties for a preferred unequally-spaced system.

FIGS. 3 and 4 relate to a ten-channel system. FIG. 2 and Examples 1 and 2 describe an experimental 8-channel system. For optimum optical bandwidth, $B_{opt}$ (Eq. 3), it is shown that these, and more complex systems, can be made to fit within the EDFA passband. Systems operating with lesser numbers of channels, if occupying the same bandwidth, may be more widely-spaced. The trade-offs for increased bandwidth are less demanding frequency stabilization and lowered 4-wave mixing.

It is implicit that the inventive teaching is directed to increase of capacity in systems which are capacity-limited by 4WM. Stated differently, identical systems, but with equally-spaced channels, are capacity-limited by 4WM. Whether operating with DSF, WDMF, concatenation, or compensation, improvement in capacity may be about the same for the same total bandwidth. This multiplier is premised on the assumption that the resulting unequally-spaced system will continue to be limited by 4WM; otherwise, the improvement will be less. The teaching is usefully applied wherever capacity improvement is substantial, regardless of whether ultimate limitation is by 4WM, by chromatic dispersion, or other nonlinear effect.

Since equally-spaced channel WDM systems using fibers of dispersion greater than about 4ps/nm-km are not generally 4WM-limited, a preferred embodiment uses fiber having dispersion within the absolute value range of 0–4 ps/nm-km. It is entirely possible that future bit rate demands will make the invention useful with fiber of greater dispersion. Unequal channel spacing may be justified for future upgrading.

Specific description is for system wavelengths of about 1550 nm. Largely due to widespread acceptance of the EDFA, initial impact of the invention will likely be for systems at this wavelength. The invention is more broadly applicable. It is operative at other optical frequencies which may be transmitted on optical fiber. System operation at 1310 nm, as an example, is receiving relatively little attention. Emergence of an effective fiber amplifier at this wavelength may overcome this prejudice—may even result in simultaneous operation at both wavelengths (perhaps with use of dispersion-flattened fiber). Accordingly, discussion in terms of specific wavelengths should be considered as exemplary only. As an example, discussion of "disabled" and "enabled" systems is to be considered representative of systems with corresponding dispersion values for chosen system wavelengths.

Dispersion values are for the system wavelength. Generally, this wavelength value is established by the transmitter. Substituting or adding a different system wavelength, e.g. during upgrade, may change the dispersion value (see FIG. 5).

Similarly, discussion is generally for spans of homogeneous fiber. The inventive systems will likely be significant for use in spans made up of lengths of different fibers. Discussion of concatenated systems implicitly provides for this. Compensated systems use spans including relatively short lengths of compensating fibers—perhaps of $\geq 95\%$ homogeneous fiber, remainder compensating fiber.

Optimal Channel Spacing

Channel allocation uses an integer linear program (ILP) based on a "Golomb Ruler". See, J. P. Robinson, "Optimum Golomb Rulers", IEEE *Transactions on Computers* Vol. c-28, No. 12, December 1979, pp. 943,944. The advance is regarded as showing feasibility of unequal channel spacing to increase capacity. In a more specific sense a variation on the purely mathematical Golomb Ruler is usefully applied to an unfamiliar problem. The 4WM problem involves large inter-channel spacing relative to the equivalent measure in problems to which it is traditionally applied.

4WM is a nonlinear process in which three waves of frequencies $f_i$, $f_j$, and $f_k$ ($k \neq i,j$) interact through the third-order electric susceptibility of the optical fiber to generate a wave of frequency $$f_{ijk} = f_i + f_j - f_k. \quad \text{Eq. (1)}$$

Thus, three copropagating waves give rise, by 4WM, to nine new optical waves.

In a WDM system, this happens for every possible choice of three channel waves. The problem is aggravated for greater numbers of channels. In an eight-channel system, hundreds of new waves are generated by 4WM. In conventional WDM systems the channels are typically equally spaced in frequency. Equal spacing substantially worsens the effects of 4WM, since all WDM product terms falling within the bandwidth of the system fall precisely at the channel frequencies and decrease signal-to-noise ratios. In addition, distortion on the "1" bits is enhanced by parametric gain at the detector may further decrease signal-to-noise ratio.

If the frequency separation of any two channels of a WDM system is different from that of every other pair of channels, no 4WM waves will be generated at a nominal channel frequency. A design methodology is presented to satisfy the above requirement. The method is related to a proposed method for reducing the effect of 3rd order intermodulation interference in radio systems. See, W. C. Babcock, "Intermodulation interference in radio systems," *Bell Syst. Tech. J.*, vol. 32, pp. 63–73, January 1953; and M. D. Atkinson, N. Santoro, and J. Urrutia, "Integer sets with distinct sums and differences and carrier frequency assignments for nonlinear repeaters," *IEEE Trans. Commun.*, vol. COM-34, pp. 614–617, June 1986. Simulations and experimental results confirm that the proposed channel allocations allows considerable reduction of performance degradation due to 4WM.

The channel allocation design can be reduced to an integer linear programming (ILP) problem, by dividing the available optical bandwidth into equal slots of bandwidth $\Delta f$ larger than the bandwidth occupied by a 4WM wave (which is always larger than the bandwidth of a channel, e.g. 0.15 nm relative to 0.1 nm). Given an (arbitrary) reference optical frequency $f_o$, the i-th slot is centered around the optical frequency $f_i = f_o + n_i \Delta f$, where n i is an integer that will be referred to as the slot number of the i-th frequency slot. In terms of slot numbers, equation (1) becomes $$n_{ijk} = n_i + n_j - n_k (k \neq i,j) \quad \text{Eq. 1a}$$

If $n_{ijk}$ does not coincide with any of the channel slot numbers for any choice of i, j, k, no 4WM wave generated by the signals is created on any of the channel slots. If N is the number of channels to be transmitted, it is then enough to choose N slots (with increasing slot numbers) ($n_1, n_2 \ldots n_N$) such that $$\forall i,j,k \in 1 \ldots N (k \neq i,j), n_{ijk} \notin (_1 n_2, \ldots n_N) \quad \text{Eq. (2)}$$

Equation 2 is equivalent to requiring that for any two different pairs of channel slots, the frequency separation between the channels in each pair is different.

The 4WM problem has then been reduced to the ILP problem of finding a vector of N−1 positive integers ($m_1$, $m_2, \ldots m_{N-1}$) such that the N(N−1)/2 partial sums of adjacent elements $$S_{ik} = \sum_{i}^{k} m_i (1 \leq i < k \leq N) \quad \text{Eq.(3)}$$

or expressed in frequency units:

$$S_{ik}\Delta f = \sum_{i}^{k} m_i \Delta f (1 \leq i < k \leq N) \quad \text{Eq.(3a)}$$

are all different from each other. In usual systems, there is some practical constraint on closeness of channels, and also a desire for least total bandwidth. This may be expressed as the requirement that the total sum $$S = \Sigma_{i=1}^{M} m_i$$

be a minimum, to minimize the total optical bandwidth ($B_{op}=S\Delta f$) occupied by the WDM system.

At the receiver end, optical filters are used to separate the channels before detection. A minimum frequency spacing ($\Delta f_c = n\Delta f$) between channel slots must be provided to allow an adequate amount of rejection of the undesired channels. This imposes on the ILP problem the additional constraint $m_i \geq n$, where $n\Delta f$ is the minimum frequency separation between adjacent channels.

This ILP problem can be shown to be NP-complete, so that no general, efficient method to solve it is known, and optimum solution can be found only with an exhaustive computer search.

A lower bound to the total optical bandwidth required $B_{opt}$ can be found just from the condition that the $m_i$'s must be different from each other (and larger than n). It follows that:

$$B_{opt} \geq \left( 1 + \frac{\frac{N}{2} - 1}{n} \right) B_c, \quad \text{Eq.(4)}$$

where $B_c = (N-1) \Delta f_c$ is the total optical bandwidth of a conventional WDM system with the channels equally spaced by $\Delta f_c$.

Figure 13:
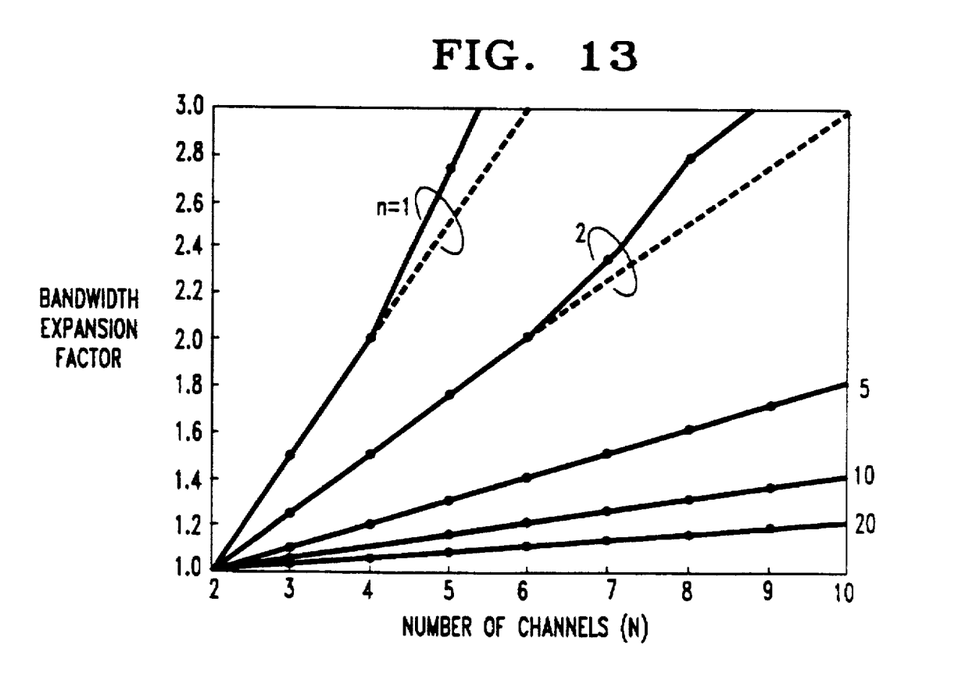
FIG. 13 shows the bandwidth expansion required for maintaining the same minimum channel-to-channel separation for a system of the invention.

FIG. 13 shows the bandwidth expansion factor, defined as $B_{opt}/B_c$ versus N, the number of channels in the WDM system, for various values of the minimum separation parameter n. The solid lines are plotted from values obtained with the computer exhaustive search, while the dash-dotted line represents the lower bound from Eq. 4. For $n \geq 5$, and up to 10 channels, the lower bound is achievable.

This consideration n−$\geq$5—is significant for most system design whether or not a bandwidth expansion factor is applied. This n ratio, that of minimum channel spacing and minimum distance of any 4WM product to any channel, provides for channel broadening due to self-phase modulation. Assuring substantial separation also lessens beat products produced by WDM product and channel. The ratio of 5 is attainable and is reasonable assurance. For small numbers of channels e.g. for 4 channels—passband requirements may be relaxed, to permit larger ratios (up to 10 and greater). Under other circumstances, ratios as small as 2 will suffice.

The effectiveness of the proposed unequal channel spacing in keeping mixing products outside the channel frequency slots is shown in FIGS. 3 and 4, where the number of mixing products falling on each frequency slot $\Delta f$ is plotted for the case of a 10-channel system with n=5 and $\Delta f_c = 1$ nm. In FIG. 3, most 4WM mixing products coincide with channel carriers. The total bandwidth, accordingly, amounts to 9 mm. Note that all mixing products in the bandwidth of the system are located on slots occupied by the channels, generating maximum interference, and that on some channels there are more than 50 4WM waves. FIG. 4 shows the effect of using unequal spacing. The bandwidth expansion factor, from FIG. 13 is 1.8, so that the bandwidth is increased to 16 mm, but now there are no mixing products on slots occupied by the channels. They are all evenly distributed on the slots between the channels and their effect can be filtered out at the receiver.

An optical filter used at the receiver to select the desired channel will pass, with some attenuation, the 4WM waves generated in the slots near the channel slot. Waves generated by beating between the channel and those 4WM waves must be filtered out as well. This may be done with an electrical filter. Therefore $\Delta f$ must be large enough to avoid appreciable overlap of channel waves and 4WM waves, allowing for instability in the channel frequencies. Since the rms frequency jitter of a 4WM wave is three times that of a channel, the superimposition of the spectra in negligible, when the channel frequency stability is of the order of $\Delta f/10$, provided that $\Delta f$ is greater than 2R, where R is the bit rate. In order to provide an adequate amount of rejection without distorting the desired channel, a minimum channel separation $\Delta f_c \gtrsim 10R$ should be provided, therefore a value for $n = \Delta f_c/\Delta \approx 5$ is appropriate.

Ultimately, election to use the inventive teaching is a question of cost. Conservatively, effective use of the algorithmically-determined channel spacings, requires channel stabilization to $\pm 0.5$ Å($\pm 5$ GHz). By comparison, the requirement for equally-spaced channels (with spacing equal to the least spacing value for the unequal-spaced system) is simply avoidance of channel overlap, i.e. stabilization at 0.5 nm—an order of magnitude less demanding. Stabilization at the required level is attainable, for example, by locking the channels to selected modes of a Fabry-Perot filter with free spectral range equal to $\Delta f$.

FIGS. 3 and 4 illustrate the effectiveness of the algorithmically-determined unequal channel spacing in keeping mixing products outside the channel frequency slots. FIG. 3 is plotted for 10 equally-spaced (125 GHz-spaced) channels, centered about a nominal carrier wavelength of 1550 nm. (The computer solution is in purely numerical terms with channels at 1, 6, 11, 16, etc.) The ordinate is in number of mixing products. The channel-to-channel spacing is 1 nm, here considered the minimal spacing required for optical filter-channel selection, thereby yielding a total bandwidth of 9 nm. All mixing products within this bandwidth are located on channel slots.

In FIG. 4 comparison is made with a similar system, but with algorithmically-designated channels at 1, 6, 16, 22, 30, 39, 50, 57, 69, 82. To retain the minimum permitted channel spacing results in a bandwidth expansion factor (Eq. 4) of 1.8, or a total bandwidth of 16 nm. All mixing products are now located on slots between the channel slots so that their effects can be filtered out.

EXAMPLES

The mass of experimental data reported in Examples 1 and 2 were carried out on the circuit of FIG. 2. The two numbered examples compare equal channel spacing with unequal channel spacing for otherwise identical systems. Comparative results are reported in the form of FIGS. 6, 7, 8, 9 and 10.

FIG. 2 shows the 8-channel circuit providing for repeaterless transmission of eight 10-Gb/sec channels over 137 km of DSF. Eight external-cavity lasers, represented in terms of their emission wavelengths, $\lambda_1$ through $80_8$ are multiplexed by 4×1 passive couplers 30 and 31 together with 2×1 passive coupler 32. Two EDFAs, 33 and 34, compensated for coupler loss. LiNbO$_3$ modulator 35 produces a 10 Gb/sec pseudorandom bit stream. A spool of 20 km of low polarization mode dispersion (PMD) unshifted fiber 36 having chromatic dispersion of 16ps/nm-km at 1550 nm introduces discrete delays, to result in a 3-bit shift per channel at the rate of 10 Gb/sec. (In this way, the same 10-Gb/sec bit stream simultaneously imposed on all channels, is made to simulate individually-modulated channels.) Low PMD provides a worst case for 4WM (both for equal and unequal channel spacings). After being amplified by EDFA 37, the signals were passed through variable power attenuator 38 to adjust the launched power. Element 38 together with a 137 km spool 39 of DSF provided appropriate insertion loss and 4WM. The dispersion-shifted fiber had an insertion loss of 0.24 dB/km. To provide a worst case scenario, the channel frequencies, both for equal and unequal spacing, were chosen to locate the zero-dispersion wavelength, $\lambda_0$, between and evenly-spaced from channels 2 and 3 (those of carrier wavelengths $\lambda_2$ and $\lambda_3$). Input and output spectra were viewed on optical spectrum analyzer 40 with signal derived from junction 41 or junction 42. The signal then passed through EDFA 43, and thereafter, variable optical filters 44, 45, EDFA 46 and variable optical filter 47. (Three off-the-shelf filters were required for the desired discrimination. The filter array provided more than 23 dB rejection of unselected channels.) Elements 48 and 49 provided for optical-to-electronic conversion and for electronic filtering. Electronic filters, conventionally included in commercial repeaters, are adequate for filtering out spurious signals resulting from beating between channel carriers and closely-spaced 4WM products. Results were observed by use of bit error rate test set 50 and oscilloscope 51. Element 50 serves as well for generation of the pseudorandom bit stream (PRBS) which, in the experiment, contained $23^{-1}$ bits. Comparison of the generated stream at 52 with the input stream at 53 was made.

EXAMPLE 1

Figure 6:
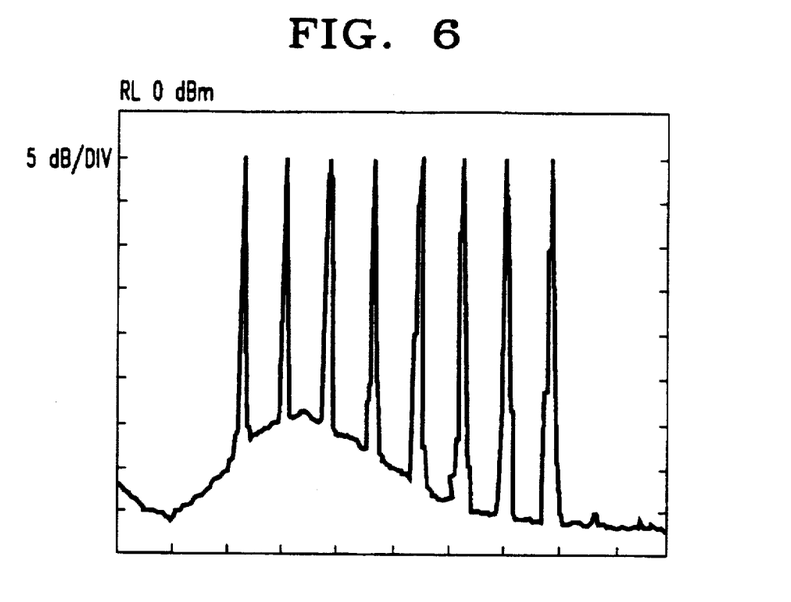
FIG. 6 is the input spectrum for equally-spaced channels.
Figure 8:
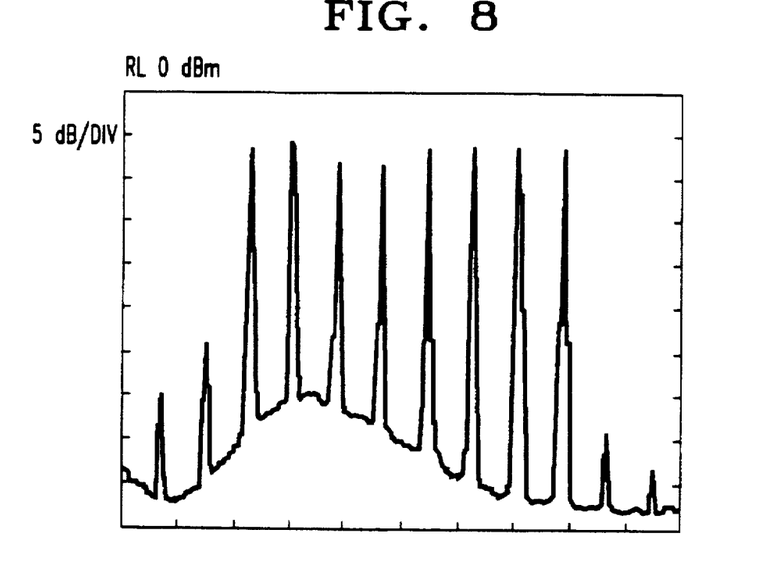
FIG. 8 is the output spectrum for equally-spaced channels.

The system of FIG. 2 was used for channels equally-spaced at 1.6 nm, so that total bandwidth was 11.2 mm. Input and output spectra are shown in FIGS. 6 and 8. The output eye diagram is shown on FIG. 10. Launch power was 3d Bm (2 mw).

EXAMPLE 2

Figure 7:
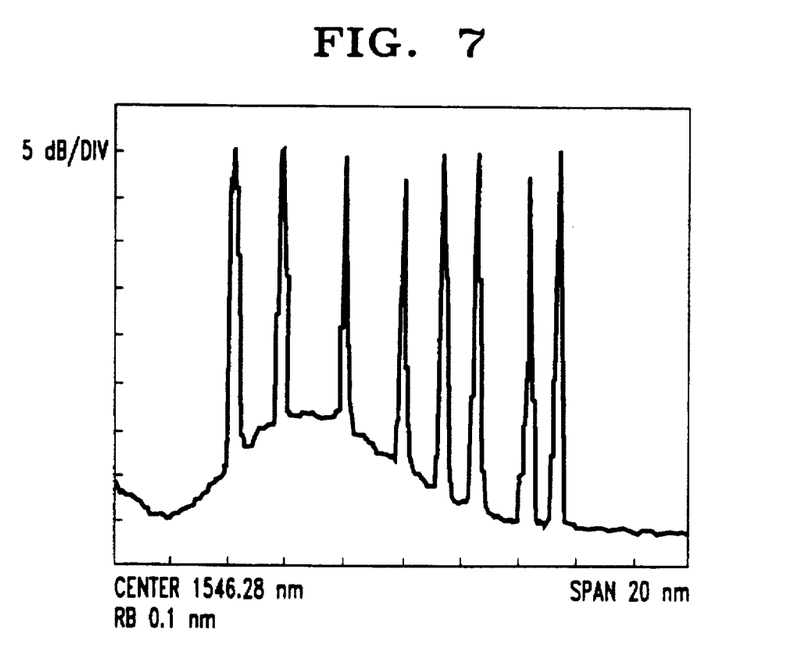
FIG. 7 is the input spectrum for unequally-spaced channels.
Figure 9:
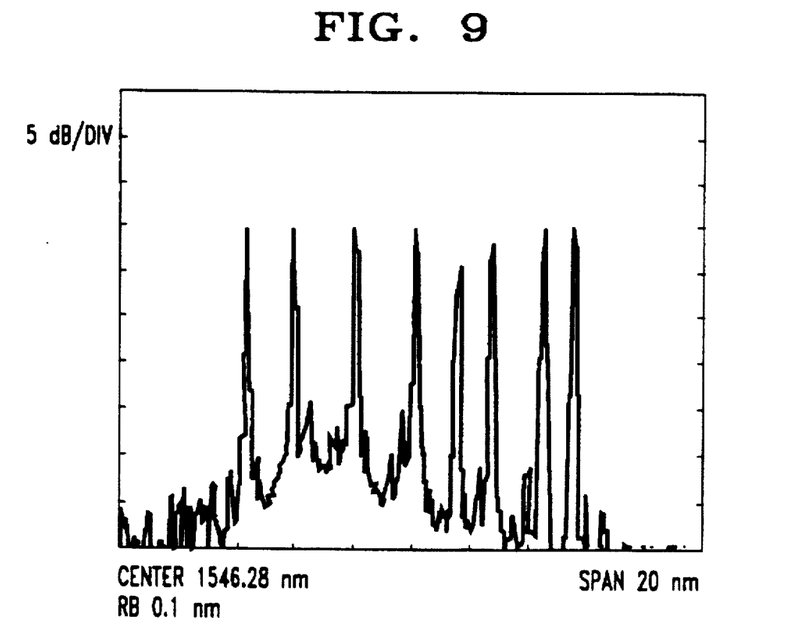
FIG. 9 is the output spectrum for unequally-spaced channels.
Figure 10:
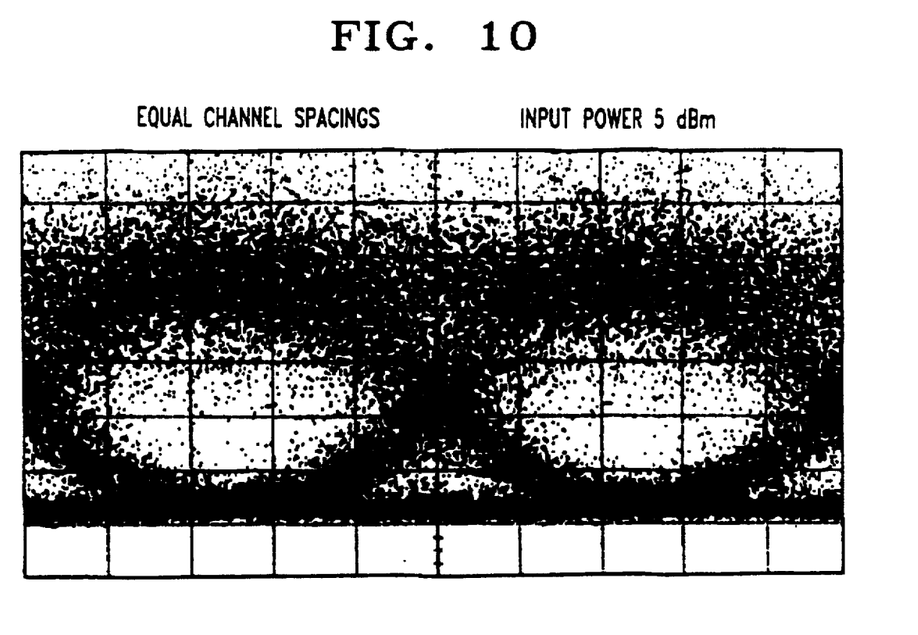
FIGS. 10 and 11, on coordinates, of power in mw and time in ns, are eye diagrams for equal channel spacing and unequal channel spacing, respectively, for the conditions of FIGS. 8 and 9.
Figure 11:
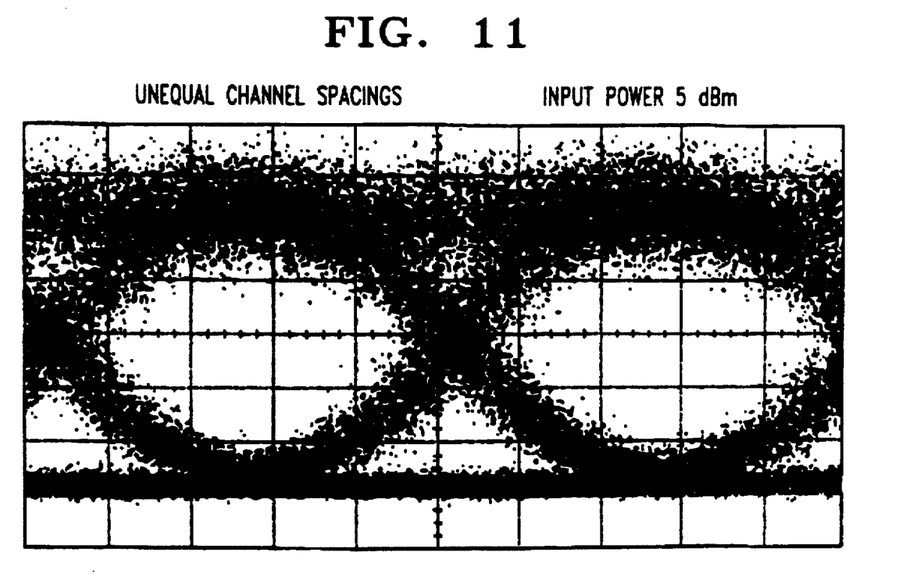

The same system was used with unequally-spaced channels with 5 dBm of launched power. In this instance, with the objective of maintaining the same total bandwidth of 11.2 mm, the minimum spacing was set at 1 nm minimum channel spacing. Input and output spectra are shown in FIGS. 7 and 9; the output eye diagram is shown on FIG. 11. In both this example and in Example 1, eye diagrams are for the third channel (the worst channel).

The level of mixing products is higher for unequal spacing (FIGS. 8 and 9) because the launched power is higher. The relatively open eye for unequal spacing (compare FIG. 11 with FIG. 10), despite higher launch power, goes to the thrust of the invention. Comparing output spectra of FIGS. 8 (equal spacing) and 9 (unequal spacing) shows that 4WM products are generated outside of the channel bandwidths for unequal spacing.

The Brillouin threshold for the system was found to be 10 dBm—a value above the highest launch power of 9 dBm. This and other considerations confirm that the system, as improved, continues to be capacity-limited by 4WM.

Figure 12:
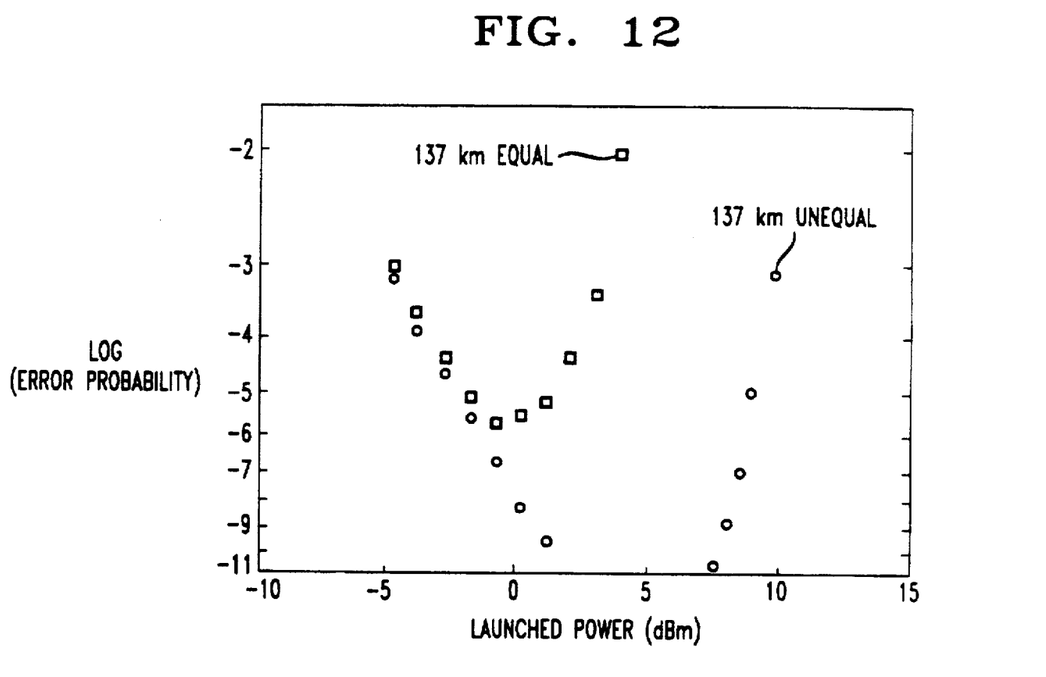
FIG. 12 on coordinates of error probability and launched power, compares the relationship of these coordinate values for equal and unequal channel spacing.

FIG. 12 is a plot of error probability in logarithmic on the ordinate against launch power on the abscissa for the system operations of Examples 1 and 2. Data points for unequal spacing are represented by circles, and for equal spacing by squares. For low transmitted power, below −2 dBm, equal and unequal systems perform equally with regard to 4WM. As power is increased, performance degrades dramatically in the equally-spaced system to result in a bit error rate above $10^{-6}$. The unequally-spaced system however continues to improve for increasing launch powers up to about +7 dBm. (Initial improvement in bit error rate is due to relative decrease in contribution by amplifier noise.)

The unequally-spaced system of FIG. 12 is essentially error-free (bit error rate≦$10^{-11}$ for launch powers in the range of from 2 dBm up to 7 dBm.

The upturn in error rate for the unequally-spaced system is believed to be due in part to simple power depletion due to power transferred to 4WM products which fall outside of channel bands.

Other Figures

Figure 1:
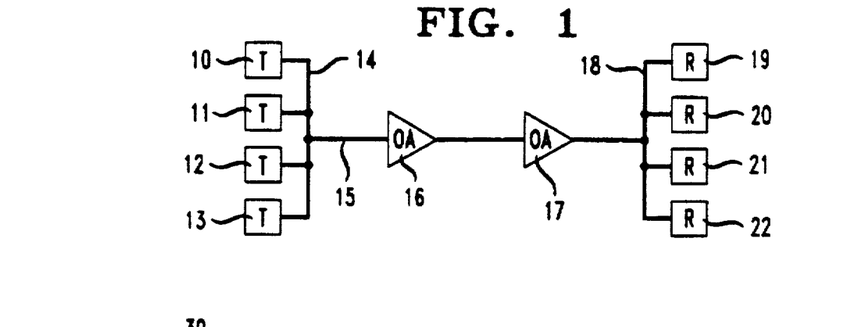
FIG. 1 is a generalized circuit diagram for a WDM system using unequally-spaced channels.

FIG. 1 is a WDM system. It consists of a transmitter 23 which includes four channel generators, 10, 11, 12, and 13, combined in a passive 4:1 coupler 14. The combined signal is introduced into fiber transmission line 15 which is provided with two optical amplifiers 16 and 17. At the receiver 24, the four-channel signals are separated by demultiplexer 18, after which the separated signals are routed to the four regenerators 19, 20, 21 and 22.

Figure 5:
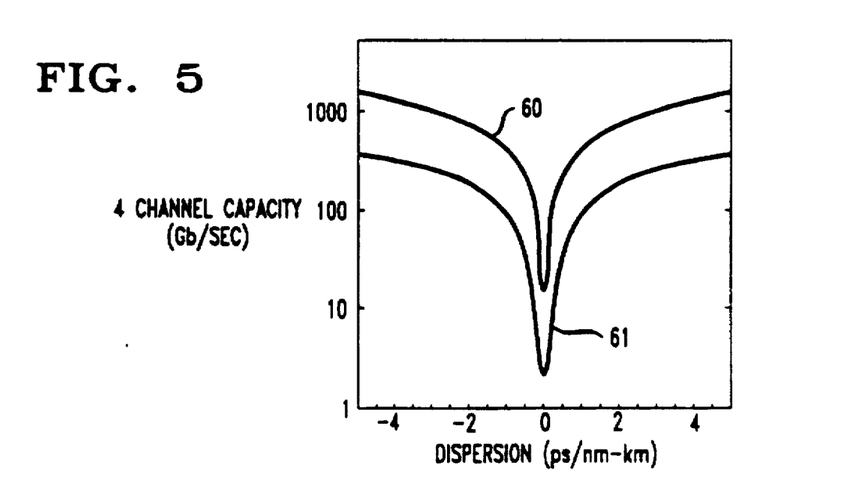
FIG. 5 is a plot relating: total capacity for an equally-spaced and an unequally-spaced multi-channel WDM system; to magnitude of chromatic dispersion.

FIG. 5 compares bit capacity for equally-spaced (curve 60) and unequally-spaced (curve 61) systems as a function of dispersion. The numerical ordinate values are for a 4-channel system of 360 mm span length. At zero dispersion, the equally-spaced system has a capacity of about 2 Gb/sec. Unequal spacing, still using zero dispersion fiber, increases capacity to about 12Gb/sec. Comparing the curves, about the same improvement is realized for the entire range of dispersion values, so that a capacity of about 120 Gb/sec is increased to about 900 Gb/sec. for an "enabled" system operating at a system wavelength of 1550 nm and using WDMF (fiber with a dispersion of 2.0 ps/nm-km at this wavelength).

The same curve form, and same relative capacities, apply to more complex systems. Examples 1 and 2, for an 8-channel system, is illustrative.

An assumption is made in discussing capacity improvement. The 4× improvement (6 dB) is on the assumption of unchanged total bandwidth. This is appropriate for the reason that total bandwidth is generally constrained by passband considerations—i.e. by EDFA passband. Since 4WM efficiency increases with decreased spacing, the assumption prejudices the inventive approach, so that the 4× multiplier is conservative. If, on the other hand, only the minimum channel-to-channel spacing is retained, so that the total bandwidth is expanded, mixing efficiency is reduced for all but a single channel pair. For this expanded bandwidth, improvement is about 9 dB (multiplied by a factor of about 8×).

FIG. 5 is representative of systems of the invention which may include more than 4 channels. are now contemplated. Longer systems may include longer spans, or multiple spans so that the four transmitters may serve for regeneration. For a contemplated equally-spaced 4-channel system, span length is 360 mn and amplifier spacing is 120 km. Channel spacing, the difference in carrier wavelength is 200 GHz (or about 1.5 nm). The corresponding inventive system uses channels spaced at 180, 200, and 220 GHz. A fiber path may, as discussed, consist largely of constant dispersion fiber end-to-end, or may be made up of concatenated or compensated fiber.

The data presented on FIG. 13 may be used for determining the smallest channel spacing for the constant bandwidth case. This channel is simply reduced by the inverse of the expansion factor.

What is claimed is:

1. Wavelength division multiplexed optical communication system including: transmitter means containing generator means and modulator means for generating, modulating, and introducing a set of multiplexed channel carries into an optical transmission line, the carries having "carrier wavelengths" within a "total bandwidth" distributed about a "system wavelength"; receiver means including de-multiplexer means for de-multiplexing channel carries; optical amplifiers; and a transmission line of optical fiber including at least one fiber span defined at one end by such transmitter means and at the other end by such receiver means, in which the span includes at least one optical amplifier; wherein the set includes at least 4 channels of wavelengths, $\lambda_1$, $\lambda_2$, $\lambda_3$, $\lambda_4$, with a total bandwidth sufficiently narrow that channel carriers produce four-wave-mixing (4WM) products which limit attainable system capacity characterized in that channel-to-channel frequency spacings are unequal and in that spacing are of such magnitudes as to assure substantial non-coincidence of wavelength of any 4WM product with any channel carrier wavelength, whereby the 4WM limit on capacity is lessened.

2. System of claim 1 in which the ratio of (minimum channel-to-channel spacing) to (minimum spacing of any 4WM product from any channel) is equal to a value of at least 2.

3. System of claim 1 in which the ratio of (minimum channel-to-channel spacing) to (minimum spacing of any 4WM product from any channel) is equal to a value of at least 5.

4. System of claim 1 in which the fiber constituting a substantial part of a span has a dispersion value as measured at the system wavelength of 0–4 ps/nm-km.

5. System of claim 4 in which Dispersion Shifted Fiber constitutes a substantial part of the span.

6. System of claim 1 in which the fiber constituting a substantial part of a span has a dispersion value as measured at the system wavelength of 1.5–4 ps/nm-km.

7. System of claim 6 in which the system wavelength is approximately 1550 nm.

8. System of claim 7 in which the optical amplifier is an erbium-doped fiber amplifier.

9. System of claim 8 in which the total bandwidth is 30 nm.

10. System of claim 8 in which the total bandwidth is 10 nm-20 nm.

11. System of claim 1 in which the set includes at least 4 channels.

12. System of claim 1 in which the set includes at least 8 channels.

13. System of claim 1 in which the least channel-to-channel spacing is a maximum of 0.8 nm.

14. System of claim 1 in which per-channel bit rate is at least 2.5 Gb/sec.

15. System of claim 1 in which per-channel bit rate is at least 5.0 Gb/sec.

16. System of claim 1 in which span length is at least 360 km and in which system capacity is at least 10 Gb/sec.

17. System of claim 16 in which the span includes at least two fiber amplifiers.

18. System of claim 1 in which the channel-to-channel frequency spacings, $m_i \Delta f$, $i=1, \ldots, N-1$ where N is the number of channels and $\Delta f$ is the minimum spacing of any 4WM product from any channel, satisfy the condition that the spacing between any two channels, $$S_{ik}\Delta f = \sum_{i}^{k} m_i \Delta f (1 \leq i < k \leq N),$$

must be different from that of any other pair of channels, subject to the constraint that all $m_i \geq n$ where n is an integer greater than 1, and $n\Delta f$ is the minimum allowed channel spacing.

19. Communication method for an optical fiber communication system comprising: generating a set of at least four channel carriers; modulating the carriers, thereby creating a modulated set of carriers, each constituting a bit stream; multiplexing the modulated carriers; launching the modulated set of carriers onto a single optical fiber; simultaneously passing all members of the modulated set through a single fiber amplifier, in which the bit stream in each channel contains at least 2.5 Gb/sec; and receiving digital signals at a receiver which is at least 360 km distant from the launch point characterized in that channel-to-channel frequency spacings are unequal and in that spacings are of such magnitudes as to assure substantial non-coincidence of wavelength of any 4WM product with any channel carrier wavelength, whereby the 4WM limit on capacity is lessened.

* * * * *